(12) United States Patent
Zhang

(10) Patent No.: US 6,715,743 B2
(45) Date of Patent: Apr. 6, 2004

(54) GAS HUMIDIFIER

(76) Inventor: Chaojiong Zhang, 762 Peach Creek Cut Off Rd., College Station, TX (US) 77845

( * ) Notice: Subject to any disclaimer, the term of this patent is extended or adjusted under 35 U.S.C. 154(b) by 80 days.

(21) Appl. No.: 10/118,716

(22) Filed: Apr. 9, 2002

(65) Prior Publication Data

US 2003/0098516 A1 May 29, 2003

Related U.S. Application Data

(60) Provisional application No. 60/333,585, filed on Nov. 27, 2001, now abandoned.

(51) Int. Cl.[7] .................................................. B01F 3/04
(52) U.S. Cl. ..................... 261/130; 261/139; 261/142; 261/147; 261/152; 261/122.1; 261/123
(58) Field of Search ................... 261/130, 131, 261/139, 142, 147, 152, 159, 122.1, 123, DIG. 10; 165/60

(56) References Cited

U.S. PATENT DOCUMENTS

| | | | | |
|---|---|---|---|---|
| 3,279,441 A | * | 10/1966 | Lippert et al. | .............. 122/459 |
| 4,450,118 A | * | 5/1984 | Tuin | ........................... 261/147 |
| 4,618,462 A | * | 10/1986 | Fisher | ......................... 261/130 |
| 5,278,937 A | * | 1/1994 | Alix et al. | ................... 392/402 |
| 5,803,938 A | * | 9/1998 | Yamaguchi et al. | ........ 261/130 |
| 5,965,288 A | | 10/1999 | Okamoto | |
| 6,066,408 A | | 5/2000 | Vitale et al. | |
| 6,135,433 A | * | 10/2000 | Nurmi | ......................... 261/128 |
| 6,284,399 B1 | | 9/2001 | Oko et al. | |
| 6,338,472 B1 | | 1/2002 | Shimazu et al. | |

* cited by examiner

Primary Examiner—Scott Bushey
(74) Attorney, Agent, or Firm—Law Office of Tim Cook P.C.

(57) ABSTRACT

A gas humidifier provides a continuous flow of gas through two stages of bubbling with an intermediate heating stage. Gas is introduced into an enclosure containing a quantity of bulk water by pumping the gas into a gas entry pipe or tube. The gas exits the gas entry pipe to bubble up through a bubbling evaporator. At the water surface of the bubbling evaporator, a heating element heats the gas-vapor mixture. The heated gas-vapor mixture then bubbles up through the bulk water, and the temperature of the bulk water determines the thermal cycles of the heating element. The gas-vapor mixture bubbles up through the bulk water, reaching saturation at the dew point. The saturated gas is then directed from the humidifier for use.

10 Claims, 1 Drawing Sheet

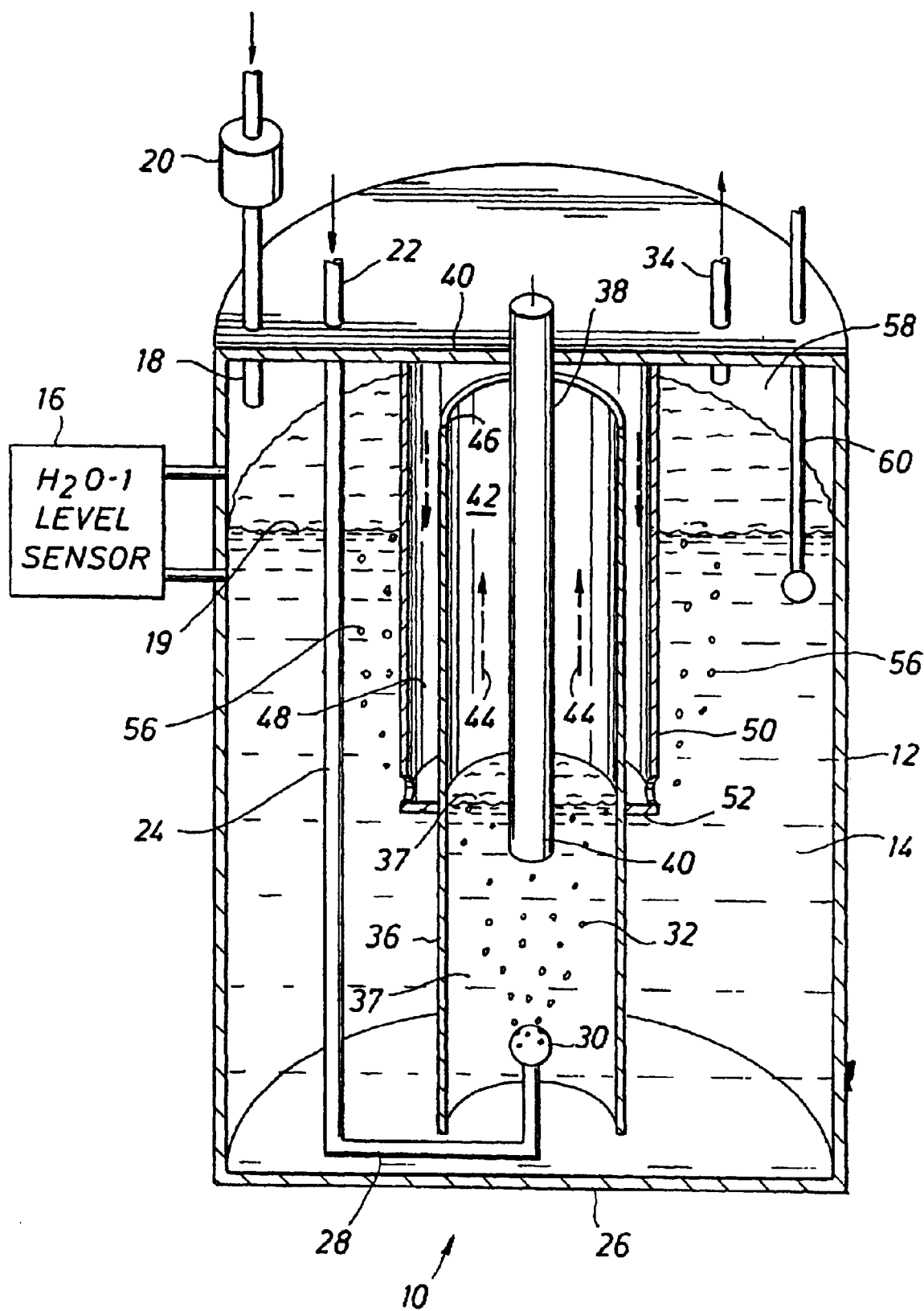

GAS HUMIDIFIER

This application claims the benefit of U.S. Provisional Patent Application No. 60/333,585 filed Nov. 27, 2001 abandoned.

FIELD OF THE INVENTION

The present invention relates generally to the field of continuous flow gas humidification systems, and, more particularly, to a method and a system for humidifying gas reactants for fuel cells or other gases.

BACKGROUND OF THE INVENTION

As described in U.S. Pat. No. 6,338,472 to Shimazu et al., humidifiers, like those of the field of the present invention, are typically used to humidify process gases supplied to an anode or a cathode of a solid polymer fuel cell. The process gases comprise a fuel gas provided to the anode and an oxidizing gas provided to the cathode. A solid polymer fuel cell generates electrical energy by electrochemical reactions in which protons generated from a fuel supplied to the anode transfer to the cathode through an electrolyte membrane and react with an oxidizing gas supplied to the cathode to produce water. The humidifier of the present invention, however, is not limited to fuel cells, but is generally applicable to the humidification of gases.

To operate a solid polymer fuel cell normally, the electrolyte membrane must be kept wet. To keep the electrolyte membrane wet, the process gases are typically humidified by one or more of a variety of techniques. For example, one commonly used technique, referred to herein as a "bubbling-type" humidifier, involves bubbling reactant gases up through a container of heated water so that water molecules are taken up with the reactant gases. An energy source is provided to facilitate the water evaporation into the gas bubbles or gas stream through the container. This method of humidification has the advantage of being very simple and inexpensive.

However, the degree of humidification depends on the height of the water column through which the gas bubbles travel, the size of the gas bubbles (and therefore the surface area of the bubbles in contact with the water), and the temperature of the water. Further, the evaporation of water under the dew point temperature is commonly relatively slow. When the flow rate of the gases through the system is slow, the total surface area of the gas bubbles is large, and evaporation of water into the gas approaches saturation. But, when flow rate is high, the size of the bubbles may be large, and there is therefore insufficient time for adequate evaporation and the humidification is commensurately below saturation.

Another known technique for humidifying reactant gases uses a "membrane-type" humidifier. One example of a membrane-type humidifier is shown and described in U.S. Pat. No. 5,996,976 to Murphy et al. In this technique, water is pumped through a heating element and then directed to one side of a porous membrane. The gases to be humidified are directed across the other side of the membrane. Water molecules penetrate the membrane from the heated water side to the reactant gas side where the water molecules evaporate into the gases and the gases absorb heat from the water. The water may be circulated through a heating chamber as described, or the water may be heated directly in an evaporation chamber. The temperature of the gas-vapor mixture is lower than the temperature of the water because evaporation occurs at the surface of the membrane. Because of this phenomenon, the temperature and humidity of the gas-vapor mixture is rather difficult to control. Further, the difficulty of control increases as the rate of gas flow increases because the amount of heat absorbed from the water is relatively high. Further, a specialized membrane is required, increasing the overall cost of such a system.

Yet another technique for the humidification of a gas involves the application of ultrasonic energy to the gas and a water bath. A quantity of water is contained within an enclosure and gas is introduced to the volume within the enclosure above the surface of the water. An ultrasonic energy source within the enclosure extends through the gas volume into the water bath. Application of ultrasonic energy generates water vapor, which is taken up by the gas and the gas-vapor mixture is withdrawn from the enclosure. This technique has the advantage of easily controllable humidity of the gas-vapor mixture for "batch" processing of gas, but is not suitable to generate and control the humidity of a continuous stream of gas.

Still another technique for humidification of a gas may be referred to as a "steam-injection-type" humidifier. In this technique, water is injected onto a hot element, such as a plate, to evaporate the water into an enclosure. Gas is pumped into the enclosure to mix with the water vapor to develop a gas-vapor mixture. The amount of water that is injected onto the heating element is calculated and controlled to meet certain humidity requirements. Further, the temperature of the exit gas-vapor mixture is controlled by controlling the temperature of the heating element.

However, this factor presents a drawback of this technique in that the heating component must use a certain minimum power to reach a temperature sufficiently high to flash the water to vapor instantly and this minimum temperature is usually much higher than the preferred mixture temperature. Also, it is difficult to quickly change the temperature of the heating element when the flow rate of gas or water changes and it is difficult to precisely control the temperature of the gas-vapor mixture, thus the mixture is likely to be overheated. Even if the mixture temperature can be adequately controlled, the range of flow rate and the range of temperature is unacceptably limited using this technique. This is because this technique requires the simultaneous control of two parameters, i.e. the temperature of the gas-vapor mixture and the temperature of the heating element, in one control loop by one means, i.e. the power to the heating element.

One proposed solution to this control problem involves the use of a condenser in the stream for the gas-vapor mixture. In principle, the humidification is carried out in two steps and two devices. The first step involves steam injection as previously described to generate an over-heated, over-humidified gas-vapor mixture. The second step involves passing the mixture through the condenser to condense the gas-vapor mixture at its dew point. A chiller is required to carry away the heat released from the condensation to maintain the condenser at the dew point. Thus, additional energy is needed to generate the over-heated and over-humidified mixture in the first step, and even more energy is required to drive the chiller to dissipate the additional heat from the cooling and condensation of the mixture. This means that this technique is very energy inefficient, and it is also bulky, complicated, and expensive to build and use.

Thus, there remains a need for a system and a method of humidifying gases that is energy efficient, simply, and easy to control, and that further provides a desired amount of humidification of a continuous gas stream. The present invention is directed to such a solution.

SUMMARY OF THE INVENTION

The present invention addresses these and other drawbacks in the art by providing a continuous flow of gas through two stages of bubbling with an intermediate heating stage. No permeable membrane is used, and only a single parameter is used for precise control of the humidification of the gas at the dew point. That is, the temperature of the bulk water is used as the parameter to control the operation of the heating element in the intermediate heating stage.

Gas is introduced into an enclosure by pumping the gas into a gas entry pipe or tube. The gas exits the gas entry pipe to bubble up through a bubbling evaporator. At the water surface of the bubbling evaporator, a heating element heats the gas-vapor mixture. The heated gas-vapor mixture then bubbles up through the bulk water, and the temperature of the bulk water determines the thermal cycles or activation of the heating element. The gas-vapor mixture bubbles up through the bulk water, reaching saturation at the dew point. The saturated gas is then directed from the humidifier for use.

It is therefore an object of the invention to provide a gas humidifier that is simple and easy to control to precisely produce saturated gas at the dew point. It is a further object of the invention to provide a method of humidifying gas with such a humidifier. It is yet another object of the invention to provide a gas humidifier that produces saturated gas at the dew point over a wide range of temperatures using a single measured parameter within the enclosure.

These and other features and advantages of this invention will be readily apparent to those skilled in the art.

BRIEF DESCRIPTION OF THE DRAWING

So that the manner in which the above recited features, advantages and objects of the present invention are attained and can be understood in detail, more particular description of the invention, briefly summarized above, may be had by reference to embodiments thereof which are illustrated in the appended drawings.

The sole drawing FIGURE is a side view of a schematic diagram showing the gas humidifier of the present invention.

DETAILED DESCRIPTION OF A PREFERRED EMBODIMENT

The Humidifier

The drawing FIGURE depicts a gas humidifier 10 constructed in accordance with the teachings of this invention. The FIGURE depicts a preferred embodiment, and is particularly adapted for the humidification of reactant gases for fuel cells, but may as easily be applied to the humidification of gases for other applications and arts, such as for example in the medical field where saturated gases find application.

The humidifier 10 comprises an insulated enclosure 12 adapted to retain a quantity of bulk water 14. The level of the bulk water 14 within the enclosure 12 is monitored by a water level sensor 16 in the conventional manner. Water is pumped into the enclosure 12 through a water inlet 18 by a water pump 20 to maintain a bulk water level 19 within the enclosure as dictated by the sensor 16. The gas to be humidified, such as for example a fuel cell reactant gas, oxygen, air, and the like, is introduced into the enclosure through a gas inlet 22. From the gas inlet, a vertical run of gas pipe 24 traverses the enclosure to a point near a bottom 26 of the enclosure. The vertical run of gas pipe 24 continues with a horizontal run of gas pipe 28 to a perforated bulb 30 adapted to continuously produce small gas bubbles 32 for upward flow. It is to be noted that the present invention is particularly adapted to process on continuous flow of gas as the inlet 22 and produce a continuous flow of saturated gas as an outlet 34.

The bulb 30 is positioned at the central axis of a cylindrical pipe 36 at or near the bottom of the pipe 36. The bulb shown be place so that the bubbles 32 are disbursed substantially uniformly in a radial direction around the pipe 36 and not permit gas to rise outside the pipe. As bubbles rise within the lower section of the pipe 36, water within the lower section of the pipe evaporates into the gas, and thus the lower portion of the pipe 36 defines a bubbling evaporator 37. The water level within the bubbling evaporator is maintained at an evaporator water level 37. The water within this lower section absorbs heat to evaporate into the gas bubbles, and thus the water within this section is somewhat cooled by the evaporation process, as described below in greater detail.

A heating element 38 is positioned coaxially with the pipe to extend from a top wall 40 of the enclosure and to a point below the evaporator level 37, thereby extending into the water within the pipe 36. The region wherein the heating element 38 extends into the water therefore defines a steam generator 40 and the point at which the heating element 38 penetrates the evaporator water level defines a crossover zone. Emersing the heating element in the water also prevents overheating and thereby damaging the heater element. The crossover zone is the area between the bubbling evaporator, the steam generator, and a volume 42 filled with humidified gas and boiled water. As the gas and vapor continue to rise through the volume 42, as shown by arrows 44, they continue to absorb heat from the heating element.

When the gas and vapor mixture reaches a top edge 46 of the pipe 36, the mixture is directed downward into an annulus 48 between the pipe 36 and a condenser pipe 50. Thus, some condensation of the mixture occurs within the annulus 48. The condenser pipe 50 joins to the pipe 36 at a bottom plate 52 and defines a plurality of perforations 54 through which the gas-vapor mixture exits the annulus 48. The gas-vapor mixture exiting the annulus 48 forms bubbles 56 in the bulk water 14 where the over saturated, overheated gas and vapor mixture condenses to form a saturated mixture. This important feature of the present invention maintains the water level within the pipe 36 at slightly below the level of the perforations 54 and ensures that the heating element remains immersed in the water at all times. Further, any under-humidified gas will be further heated and humidified through this bubbling action through the bulk water.

The gas-vapor mixture bubbles 56 rise to a vapor zone 58 and then exit the enclosure 12 through the outlet 34, now in a saturated condition at the dew point of the mixture. Thus, in summary, the humidifier as shown in the drawing FIGURE, takes in a continuous stream of gas or mixture of gases to be humidified and develops a saturated gas or mixture of gases at the dew point. Within a single enclosure, and in serial steps, the apparatus bubbles the gas through a first region of water to develop a gas-vapor mixture, heats the gas-vapor mixture in a heating zone, and then bubbles the heated mixture through a bulks mixture to develop a saturated mixture. The operation of the apparatus will now be described in detail.

Operation of the Gas Humidifier

The thermodynamic operation of the humidifier 10 starts with dry gas at substantially ambient temperature and results in saturated gas at the dew point of the gas-vapor mixture at the outlet of the enclosure. In a first step, the gas travels through the uninsulated pipe 24, absorbing heat from the bulk water 14 and cooling the bulk water by the same amount of energy. In a second step, gas from the pipe 24 is expelled from the bulb 30 to form bubbles 32. The water within the lower section of the pipe 36 evaporates into the gas bubbles, thereby cooling the water in that section of the pipe 36. In a third step, the bubbles 32 rise to the steam generator section formed by the heating element 38. The operation of the heating element 38 is controlled by the temperature within the bulk water, as determined by a temperature sensor 60, order to maintain thermal balance within the apparatus. In a fourth step, the heated gas-vapor mixture is bubbled into the bulk water, forming bubbles 56 in the bubbling dew point condenser portion of the humidifier. In this step, the gas-vapor mixture entering the condenser portion is overheated, and thus releases energy into the bulk water and condenses to the dew point of the mixture. Using the structure of the present invention, a separation condenser and chiller is therefore eliminated, and the heat from the condensing gas-vapor mixture is released directly into the bulk water, thus conserving the energy that is lost in prior art systems using the separate condenser and chiller.

Thus, the heat balance of the apparatus is given by the following equation:

Total heat needed to generate 100% humidified gas at the dew point=total heat from steam generator−heat for heating gas−heat for water to evaporate into the gas bubbles      1.

This means that by controlling one simple parameter, the cycling of the heating element by the temperature of the bulk water, the gas-vapor mixture is assured of being at the dew point for the temperature of the bulk water. The precise humidification of the gas stream is assured for a continuous gas stream, regardless of the flow rate of the gas. In known humidification systems, the amount of humidification of the gas stream varies with the flow rate of the system, and this drawback in the art is eliminated by the present invention.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A gas humidifier comprising:
  a. a sealed enclosure defining a top, a bottom and a side and adapted to retain a quantity of bulk water to humidify gas;
  b. a gas pipe adapted to convey gas into the water within the enclosure;
  c. an evaporator pipe having an outer surface and defining a lower end above the bottom of the enclosure and an upper end below the top of the enclosure, and further adapted to receive gas bubbles from the gas pipe;
  d. a heating element within the evaporator pipe;
  e. a condensing pipe defining a lower end joined to the outer surface of the evaporator pipe and further defining an upper end joined to the top of the enclosure; and
  f. an outlet adapted to convey humidified gas from the humidifier.

2. The gas humidifier of claim 1 further comprising a plurality of holes through the condensing pipe at the lower end of the condensing pipe.

3. The gas humidifier of claim 2, wherein the evaporator pipe is adapted to retain a quantity of water and wherein the holes through the condensing pipe define the water level in the evaporator pipe.

4. The gas humidifier of claim 1, further comprising a bulb on the gas pipe adapted to convey gas bubbles into the lower end of the evaporator pipe.

5. The gas humidifier of claim 1, wherein the gas pipe penetrates the top of the enclosure.

6. The gas humidifier of claim 1, further comprising a water level sensor to sense the level of bulk water within the enclosure.

7. The gas humidifier of claim 6, further comprising:
  a. a water inlet line into the enclosure; and
  b. a source of water coupled to the water inlet line to introduce water into the enclosure based on the water level sensed by the water level sensor.

8. The gas humidifier of claim 1, further comprising a temperature sensor adapted to measure the temperature of the bulk water.

9. The gas humidifier of claim 1, where in the temperature of the bulk water, as sensed by the temperature sensor, is used to control the actuation of the heating element.

10. The gas humidifier of claim 1, wherein the condenser pipe forms an annulus around the evaporator pipe and wherein the condenser pipe is joined to the outer surface of the evaporator pipe substantially midway between the upper end and the lower end of the evaporator pipe.

* * * * *